(12) United States Patent
Kake et al.

(10) Patent No.: US 10,427,033 B2
(45) Date of Patent: Oct. 1, 2019

(54) DISPLAY CONTROL APPARATUS AND DISPLAY CONTROL METHOD

(71) Applicant: Sony Interactive Entertainment Inc., Tokyo (JP)

(72) Inventors: Tomokazu Kake, Tokyo (JP); Takayuki Ishida, Tokyo (JP); Akira Suzuki, Tokyo (JP); Yasuhiro Watari, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/772,970

(22) PCT Filed: Nov. 25, 2016

(86) PCT No.: PCT/JP2016/084936
§ 371 (c)(1),
(2) Date: May 2, 2018

(87) PCT Pub. No.: WO2017/094606
PCT Pub. Date: Jun. 8, 2017

(65) Prior Publication Data
US 2018/0318703 A1   Nov. 8, 2018

(30) Foreign Application Priority Data

Dec. 2, 2015   (JP) .................................. 2015-235896

(51) Int. Cl.
*A63F 13/25* (2014.01)
*A63F 13/211* (2014.01)
(Continued)

(52) U.S. Cl.
CPC .......... *A63F 13/211* (2014.09); *A63F 13/213* (2014.09); *A63F 13/25* (2014.09);
(Continued)

(58) Field of Classification Search
CPC ...... A63F 13/211; A63F 13/213; A63F 13/25; A63F 13/428; A63F 13/53;
(Continued)

(56) References Cited

U.S. PATENT DOCUMENTS

| 2012/0077589 A1 | 3/2012 | Takehiro | |
| 2014/0282275 A1* | 9/2014 | Everitt | ................... G06F 3/017 |
| | | | 715/863 |

(Continued)

FOREIGN PATENT DOCUMENTS

WO   2014150728 A1   9/2014

OTHER PUBLICATIONS

International Preliminary Report on Patentability and Written Opinion for corresponding PCT Application No. PCT/JP2016/084936, 13 pages, dated Jul. 6, 2018.

(Continued)

*Primary Examiner* — Corbett B Coburn
(74) *Attorney, Agent, or Firm* — Matthew B. Dernier, Esq.

(57) ABSTRACT

A gaming apparatus includes a position control section and a display control section. The position control section controls a position of an object arranged in a virtual 3D space based on a relative position between an input apparatus used by a user wearing a head-mounted display and the head-mounted display. The display control section generates an image in the virtual 3D space including the object and displays the image on the head-mounted display. When a distance between the input apparatus and the head-mounted display is equal to a first distance or more, the position control section linearly changes the object position in response to a change in position of the input apparatus. When the distance between the input apparatus and the head-mounted display is less than the first distance, the (Continued)

position control section determines the object position in accordance with a criterion different from that used when the distance between the input apparatus and the head-mounted display is equal to the first distance or more.

7 Claims, 12 Drawing Sheets

(51) Int. Cl.
| | |
|---|---|
| *G06F 3/0481* | (2013.01) |
| *A63F 13/428* | (2014.01) |
| *A63F 13/213* | (2014.01) |
| *A63F 13/53* | (2014.01) |
| *G06F 3/01* | (2006.01) |

(52) U.S. Cl.
CPC ............ *A63F 13/428* (2014.09); *A63F 13/53* (2014.09); *G06F 3/012* (2013.01); *G06F 3/0481* (2013.01); *A63F 2300/105* (2013.01); *A63F 2300/1087* (2013.01); *A63F 2300/301* (2013.01)

(58) Field of Classification Search
CPC ........ A63F 2300/105; A63F 2300/1087; A63F 2300/301; G06F 3/53; G06F 3/012; G06F 3/0481

See application file for complete search history.

(56) References Cited

U.S. PATENT DOCUMENTS

2018/0329215 A1* 11/2018 Kake ..................... G06F 3/01
2018/0373349 A1* 12/2018 Okumura ................ G06F 3/038

OTHER PUBLICATIONS

International Search Report for corresponding PCT Application No. PCT/JP2016/084936, 2 pages, dated Jan. 10, 2017.
Extended European Search Report for corresponding EP Application No. 16870543.2, 9 pages, dated Jul. 5, 2019.

* cited by examiner (a)

(b)

DISPLAY CONTROL APPARATUS AND DISPLAY CONTROL METHOD

TECHNICAL FIELD

The present invention relates to a display control technology, and more particularly, to a display control apparatus and a display control method for controlling display on a head-mounted display.

BACKGROUND ART

Games are played by wearing a head-mounted display, connected to a game console, on the head, watching a screen displayed on the head-mounted display, and manipulating a controller or other device. With an ordinary stationary display, a user's field-of-view range spreads outside the display screen, possibly making it impossible to focus one's attention on the display screen or resulting in insufficient sense of immersion. In that respect, when a head-mounted display is worn, a user cannot see anything other than an image appearing on the head-mounted display, thereby increasing a sense of immersion into the image world and further enhancing the entertaining nature of the game.

SUMMARY

Technical Problem

The inventor recognized the need for a more convenient display control technology to ensure that games using a head-mounted display can be enjoyed by more user segments.

Solution to Problem

In order to solve the above problem, a display control apparatus according to a mode of the present invention includes a position control section and a display control section. The position control section controls a position of an object arranged in a virtual three-dimensional space based on a relative position between an input apparatus used by a user wearing a head-mounted display and the head-mounted display. The display control section generates an image in the virtual three-dimensional space including the object and displays the image on the head-mounted display. When a distance between the input apparatus and the head-mounted display is equal to a first distance or more, the position control section linearly changes the object position in response to a change in position of the input apparatus. When the distance between the input apparatus and the head-mounted display is less than the first distance, the position control section determines the object position in accordance with a criterion different from that used when the distance between the input apparatus and the head-mounted display is equal to the first distance or more.

It should be noted that arbitrary combinations of the above components and conversions of expressions of the present invention between method, apparatus, system, program, and so on are also effective as modes of the present invention.

Advantageous Effect of Invention

According to the present invention, it is possible to improve convenience of head-mounted display users.

DESCRIPTION OF EMBODIMENT

In the present embodiment, a description will be given of a display technology using a head-mounted display (HMD). A head-mounted display is a display apparatus worn on a user's head in such a manner as to cover his or her eyes so that the user can view still images and videos appearing on a display screen provided in front of user's eyes. What appears on the head-mounted display may be content such as movies and television (TV) programs. In the present embodiment, however, a description will be given of an example in which a head-mounted display is used as a display apparatus for displaying game images.

Figure 1:
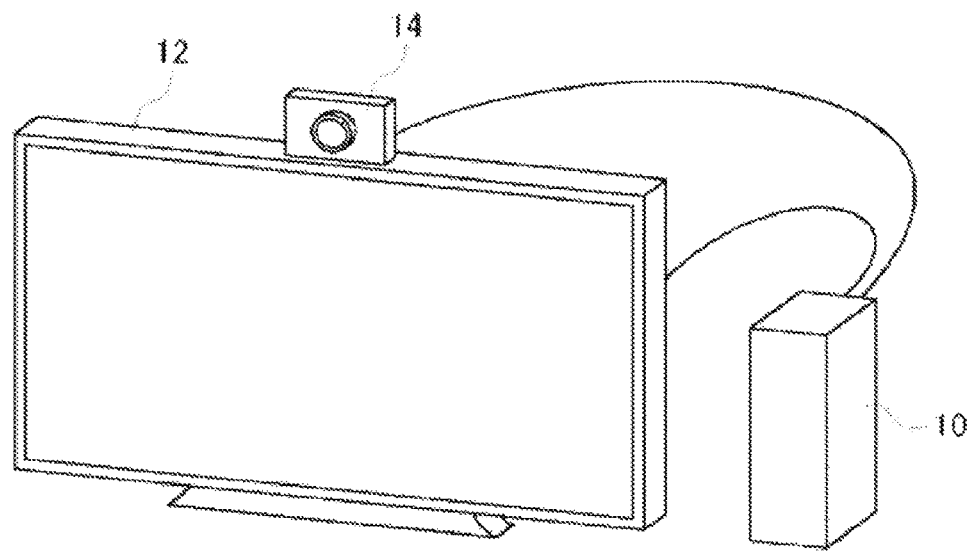
FIG. 1 is a diagram illustrating an environment in which a game system according to an embodiment is used.
Figure 1:
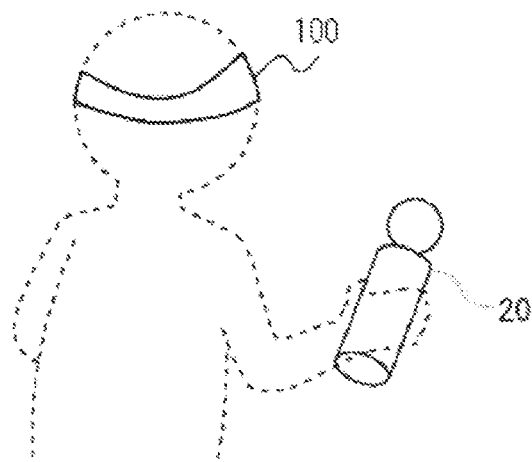

FIG. 1 is a diagram illustrating an environment in which a game system 1 according to an embodiment is used. The game system 1 includes a gaming apparatus 10, an input apparatus 20, an imaging apparatus 14, a head-mounted display 100, and a display apparatus 12. The gaming apparatus 10 executes a game program. The input apparatus 20 is used to input a user instruction to the gaming apparatus 10. The imaging apparatus 14 images a real space around a user. The head-mounted display 100 displays a first game image generated by the gaming apparatus 10. The display apparatus 12 displays a second game image generated by the gaming apparatus 10.

The gaming apparatus 10 executes a game program based on an instruction input supplied from the input apparatus 20 or the head-mounted display 100, a position or attitude of the input apparatus 20 or the head-mounted display 100, and so on, generates a first game image and transports the image to the head-mounted display 100, and generates a second game image and transports the image to the display apparatus 12.

The head-mounted display 100 displays the first game image generated by the gaming apparatus 10. The head-mounted display 100 also transports, to the gaming apparatus 10, information related to user input to the input apparatus provided on the head-mounted display 100. The head-mounted display 100 may be connected to the gaming apparatus 10 with a wired cable. Alternatively, the head-mounted display 100 may be connected wirelessly through wireless local area network (LAN) or other means.

The display apparatus 12 displays a second game image generated by the gaming apparatus 10. The display apparatus 12 may be a TV having a display and a speaker. Alternatively, the display apparatus 12 may be a computer display or other apparatus.

The input apparatus 20 has a function to transport user instruction input to the gaming apparatus 10 and is configured as a wireless controller capable of wirelessly communicating with the gaming apparatus 10 in the present embodiment. The input apparatus 20 and the gaming apparatus 10 may establish wireless connection using Bluetooth (registered trademark) protocol. It should be noted that the input apparatus 20 is not limited to a wireless controller and may be a wired controller connected to the gaming apparatus 10 via a cable.

The input apparatus 20 is driven by batteries and is configured to have a plurality of buttons for making instruction input so as to progress the game. When the user operates a button on the input apparatus 20, instruction input resulting from the operation is sent to the gaming apparatus 10 through wireless communication.

The imaging apparatus 14 is a video camera that includes, for example, a charge-coupled device (CCD) imaging device or a complementary metal-oxide semiconductor (CMOS) imaging device and generates, by imaging a real space at a given interval, a frame image for each interval. The imaging apparatus 14 is connected to the gaming apparatus 10 via a universal serial bus (USB) or other interface. An image captured by the imaging apparatus 14 is used by the gaming apparatus 10 to derive the positions and attitudes of the input apparatus 20 and the head-mounted display 100. The imaging apparatus 14 may be a ranging camera or a stereo camera capable of acquiring a distance. In this case, the imaging apparatus 14 makes it possible to acquire the distance between the imaging apparatus 14 and the input apparatus 20 or the head-mounted display 100.

In the game system 1 of the present embodiment, the input apparatus 20 and the head-mounted display 100 have a light-emitting section configured to emit light in a plurality of colors. During a game, the light-emitting section emits light in the color specified by the gaming apparatus 10 and is imaged by the imaging apparatus 14. The imaging apparatus 14 images the input apparatus 20, generates a frame image, and supplies the image to the gaming apparatus 10. The gaming apparatus 10 acquires the frame image and derives position information of the light-emitting section in the real space from the position and size of the image of the light-emitting section in the frame image. The gaming apparatus 10 treats position information as a game operation instruction and reflects position information in game processing including controlling the action of a player's character.

Also, the input apparatus 20 and the head-mounted display 100 have an acceleration sensor and a gyrosensor. Sensor detection values are sent to the gaming apparatus 10 at a given interval, and the gaming apparatus 10 acquires sensor detection values and acquires attitude information of the input apparatus 20 and the head-mounted display 100 in the real space. The gaming apparatus 10 treats attitude information as a game operation instruction and reflects attitude information in game processing.

Figure 2:
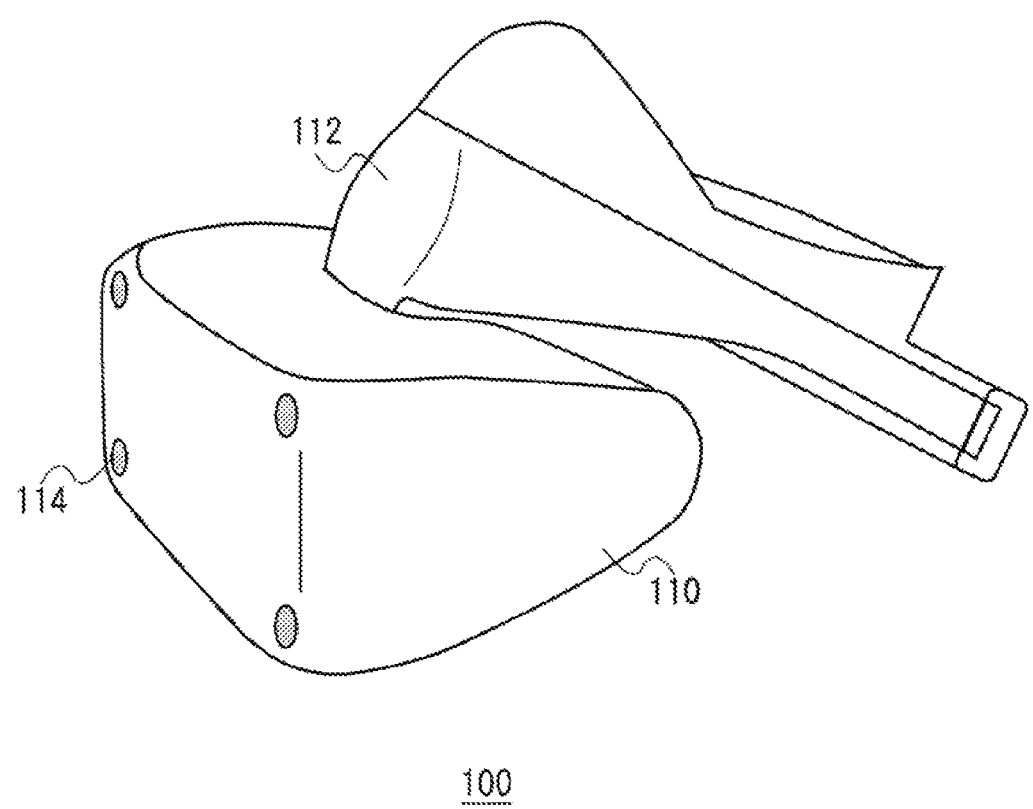
FIG. 2 is an external view of a head-mounted display according to the embodiment.

FIG. 2 is an external view of the head-mounted display 100 according to the embodiment. The head-mounted display 100 includes a main body section 110, a head contact section 112, and a light-emitting section 114.

The main body section 110 includes a display, a global positioning system (GPS) unit for acquiring position information, an attitude sensor, a communication apparatus, and so on. The head contact section 112 may include a biological information acquisition sensor capable of measuring user's biological information such as temperature, pulse, blood components, perspiration, brain waves, and cerebral blood flow. As described above, the light-emitting section 114 emits light in the color specified by the gaming apparatus 10 and functions as a criterion for calculating the position of the head-mounted display 100 in the image captured by the imaging apparatus 14.

A camera for capturing the user's eyes may be further provided on the head-mounted display 100. The camera mounted to the head-mounted display 100 permits detection of the user's line of sight, movement of the pupils, blinking, and so on.

Although a description will be given of the head-mounted display 100 in the present embodiment, the display control technology of the present embodiment is applicable not only to a case in which the head-mounted display 100 in a narrow sense is worn but also to a case in which eyeglasses, an eyeglass-type display, an eyeglass-type camera, a headphone, a headset (microphone equipped headphone), an earphone, an earring, an ear-mounted camera, a hat, a camera-equipped hat, or hair band is worn.

Figure 3:
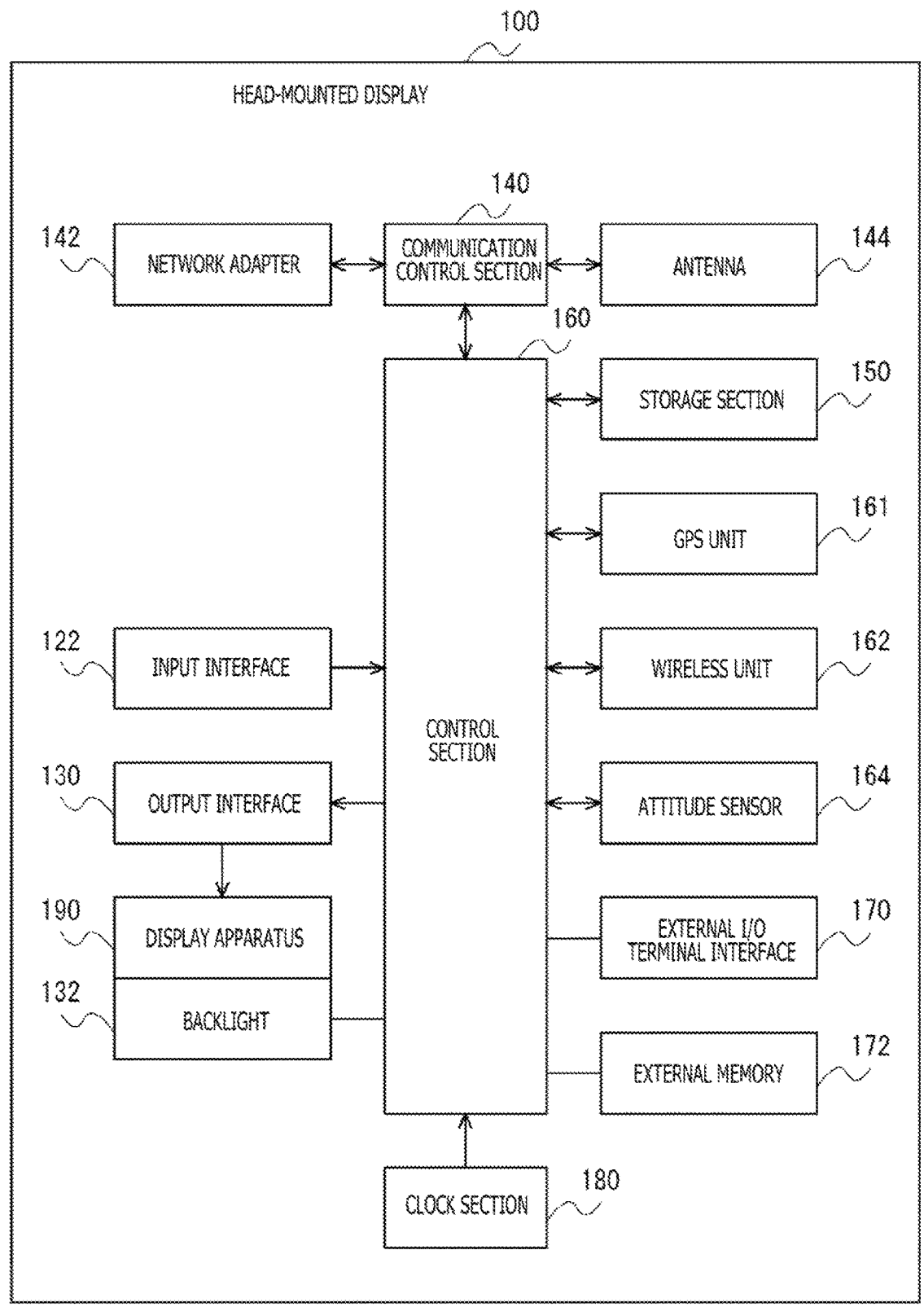
FIG. 3 is a functional configuration diagram of the head-mounted display.

FIG. 3 is a functional configuration diagram of the head-mounted display 100. The head-mounted display 100 includes an input interface 122, an output interface 130, a backlight 132, a communication control section 140, a network adapter 142, an antenna 144, a storage section 150, a GPS unit 161, a wireless unit 162, an attitude sensor 164, an external input/output (I/O) terminal interface 170, an external memory 172, a clock section 180, a display apparatus 190, and a control section 160. These functional blocks can also be realized by hardware alone, software alone, or a combination thereof in various forms.

The control section 160 is a main processor that processes and outputs signals such as image signals and sensor signals, instructions, and data. The input interface 122 accepts an operation signal and a setup signal from input buttons and so on and supplies these signals to the control section 160. The output interface 130 receives an image signal from the control section 160 and displays the signal on the display apparatus 190. The backlight 132 supplies backlight to a liquid crystal display making up the display apparatus 190.

The communication control section 140 sends, to external equipment, data input from the control section 160 in a wired or wireless communication manner via the network adapter 142 or the antenna 144. The communication control section 140 receives data from external equipment in a wired or wireless manner via the network adapter 142 or the antenna 144.

The storage section 150 temporarily stores data and parameters processed by the control section 160, operation signals, and so on.

The GPS unit 161 receives position information from a GPS satellite in accordance with an operation signal from the control section 160 and supplies position information to the control section 160. The wireless unit 162 receives position information from a wireless base station in accordance with an operation signal from the control section 160 and supplies position information to the control section 160.

The attitude sensor 164 detects attitude information such as orientation and tilt of the main body section 110 of the head-mounted display 100. The attitude sensor 164 is realized by combining a gyrosensor, an acceleration sensor, an angular acceleration sensor, and so on as appropriate.

The external I/O terminal interface 170 is an interface for connecting peripheral equipment such as USB controller. The external memory 172 is an external memory such as flash memory.

The clock section 180 specifies time information using a setup signal from the control section 160 and supplies time information to the control section 160.

Figure 4:
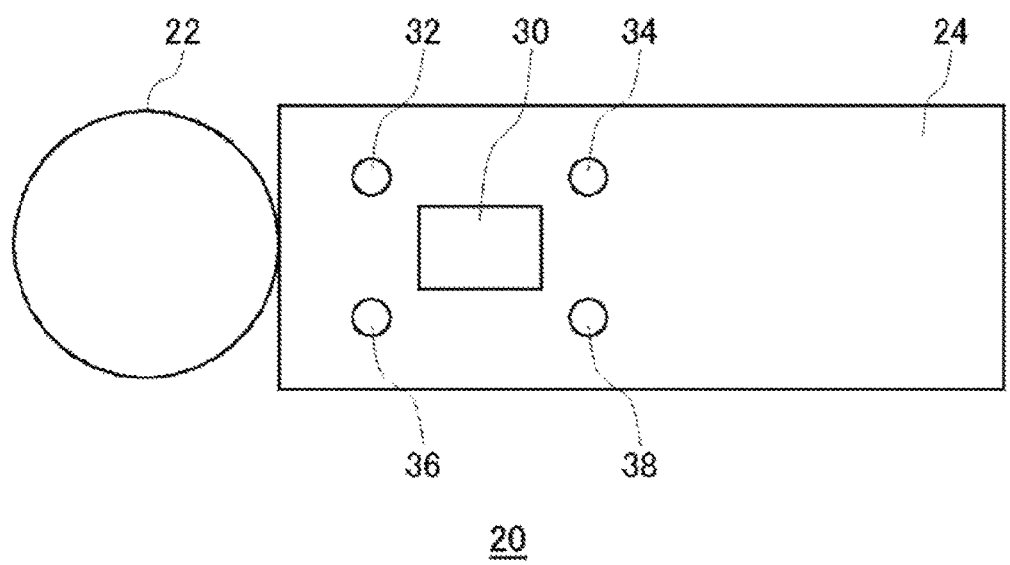
FIG. 4 depicts diagrams illustrating an external configuration of an input apparatus.
Figure 4:
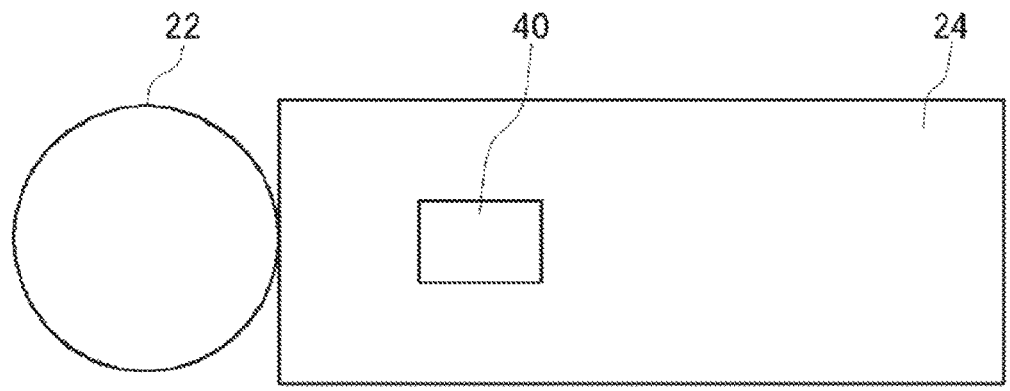

FIG. 4 illustrates an external configuration of the input apparatus 20, and FIG. 4(*a*) illustrates a top surface configuration of the input apparatus 20, and FIG. 4(*b*) illustrates a bottom surface configuration of the input apparatus 20. The input apparatus 20 has a light-emitting body 22 and a handle 24. The light-emitting body 22 has an outside light-emitting device made of a light-transmitting resin formed in a spherical shape and a light-emitting diode or an electric bulb therein. When the light-emitting device therein emits light, the entire outside spherical body shines. Operating buttons 30, 32, 34, 36, and 38 are provided on the top surface of the handle 24, and an operating button 40 is provided on the bottom surface thereof. The user operates the operating buttons 30, 32, 34, 36, and 38 with the thumb and the operating button 40 with the index finger while holding an end portion of the handle 24 with the hand. The operating buttons 30, 32, 34, 36, and 38 include pushbuttons and are operated as the user presses them. The operating button 40 may be a button that permits entry of an analog amount.

The user plays a game while watching a game screen displayed on the display apparatus 12. The imaging apparatus 14 needs to image the light-emitting body 22 during execution of a game application. Therefore, an imaging range thereof is preferably arranged to face the same direction as the display apparatus 12. In general, the user often plays games in front of the display apparatus 12. Therefore, the imaging apparatus 14 is arranged such that an optical axis thereof matches a front direction of the display apparatus 12. Specifically, the imaging apparatus 14 is preferably arranged near the display apparatus 12 such that the imaging range thereof includes a position where the user can visually recognize the display screen of the display apparatus 12. This allows the imaging apparatus 14 to image the input apparatus 20.

Figure 5:
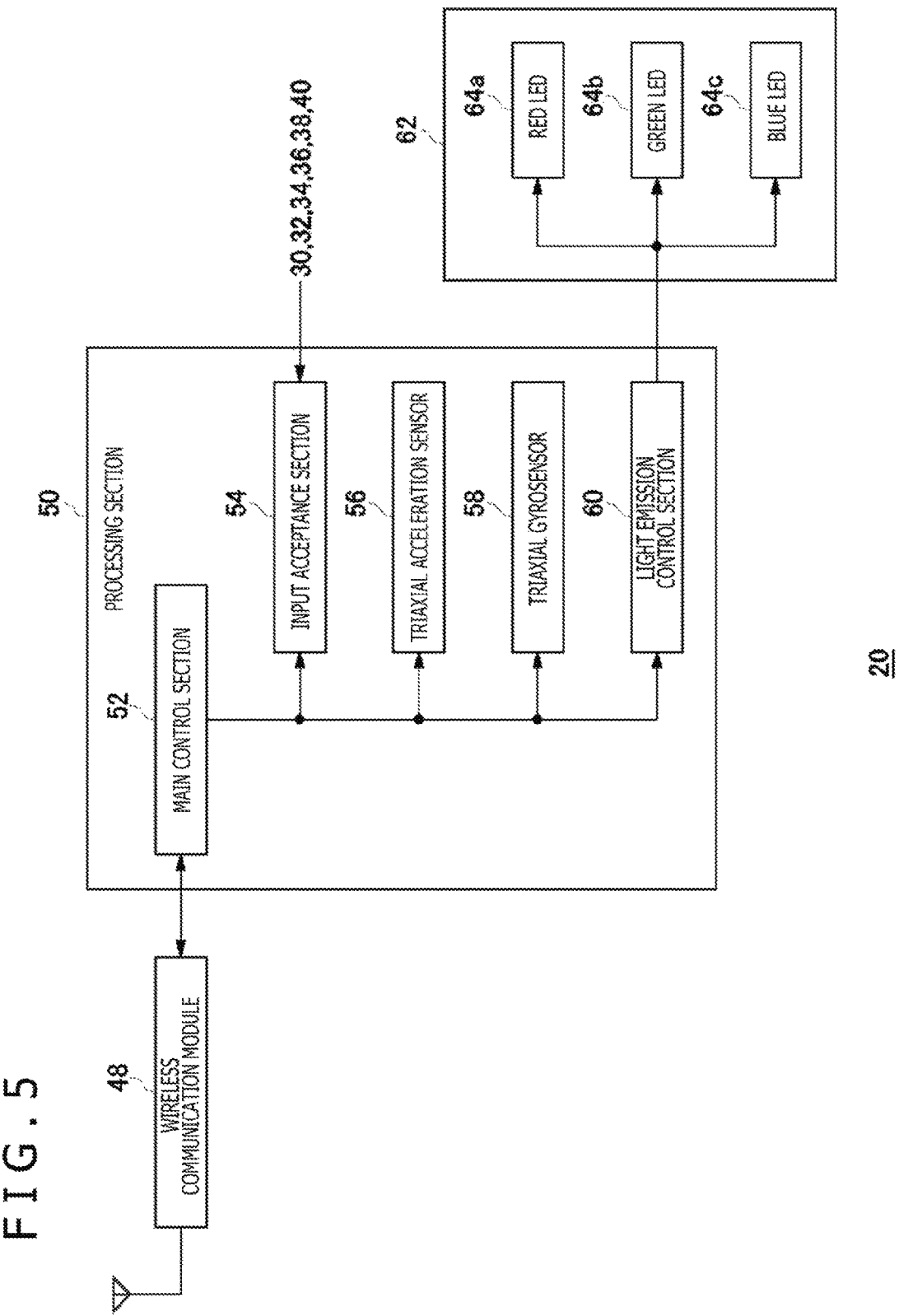
FIG. 5 is a diagram illustrating an internal configuration of the input apparatus.

FIG. 5 illustrates an internal configuration of the input apparatus 20. The input apparatus 20 includes a wireless communication module 48, a processing section 50, a light-emitting section 62, and the operating buttons 30, 32, 34, 36, 38, and 40. The wireless communication module 48 has a function to send and receive data to and from a wireless communication module of the gaming apparatus 10. The processing section 50 performs predetermined processes in the input apparatus 20.

The processing section 50 includes a main control section 52, an input acceptance section 54, a triaxial acceleration sensor 56, a triaxial gyrosensor 58, and a light emission control section 60. The main control section 52 sends and receives necessary data to and from the wireless communication module 48.

The input acceptance section 54 accepts input information from the operating buttons 30, 32, 34, 36, 38, and 40 and sends input information to the main control section 52. The triaxial acceleration sensor 56 detects acceleration components of three axial directions of X, Y, and Z. The triaxial gyrosensor 58 detects angular speeds on XZ, ZY, and YX planes. It should be noted that, here, width, height, and length directions of the input apparatus 20 are specified as X, Y, and Z axes. The triaxial acceleration sensor 56 and the triaxial gyrosensor 58 are preferably arranged inside the handle 24 and near the center inside the handle 24. The wireless communication module 48 sends, together with input information from the operating buttons, detection value information obtained by the triaxial acceleration sensor 56 and detection value information obtained by the triaxial gyrosensor 58, to the wireless communication module of the gaming apparatus 10 at a given interval. This transmission interval is set, for example, at 11.25 milliseconds.

The light emission control section 60 controls light emission of the light-emitting section 62. The light-emitting section 62 has a red light-emitting diode (LED) 64*a*, a green LED 64*b*, and a blue LED 64*c*, thereby allowing them to emit light in a plurality of colors. The light emission control section 60 causes the light-emitting section 62 to emit light in a desired color by controlling light emission of the red LED 64*a*, the green LED 64*b*, and the blue LED 64*c*.

When a light emission instruction is received from the gaming apparatus 10, the wireless communication module 48 supplies the light emission instruction to the main control section 52. The main control section 52 supplies the light emission instruction to the light emission control section 60. The light emission control section 60 controls light emission of the red LED 64*a*, the green LED 64*b*, and the blue LED 64*c* such that the light-emitting section 62 emits light in the color specified by the light emission instruction. For example, the light emission control section 60 may control lighting of each LED through pulse width modulation (PWM) control.

Figure 6:
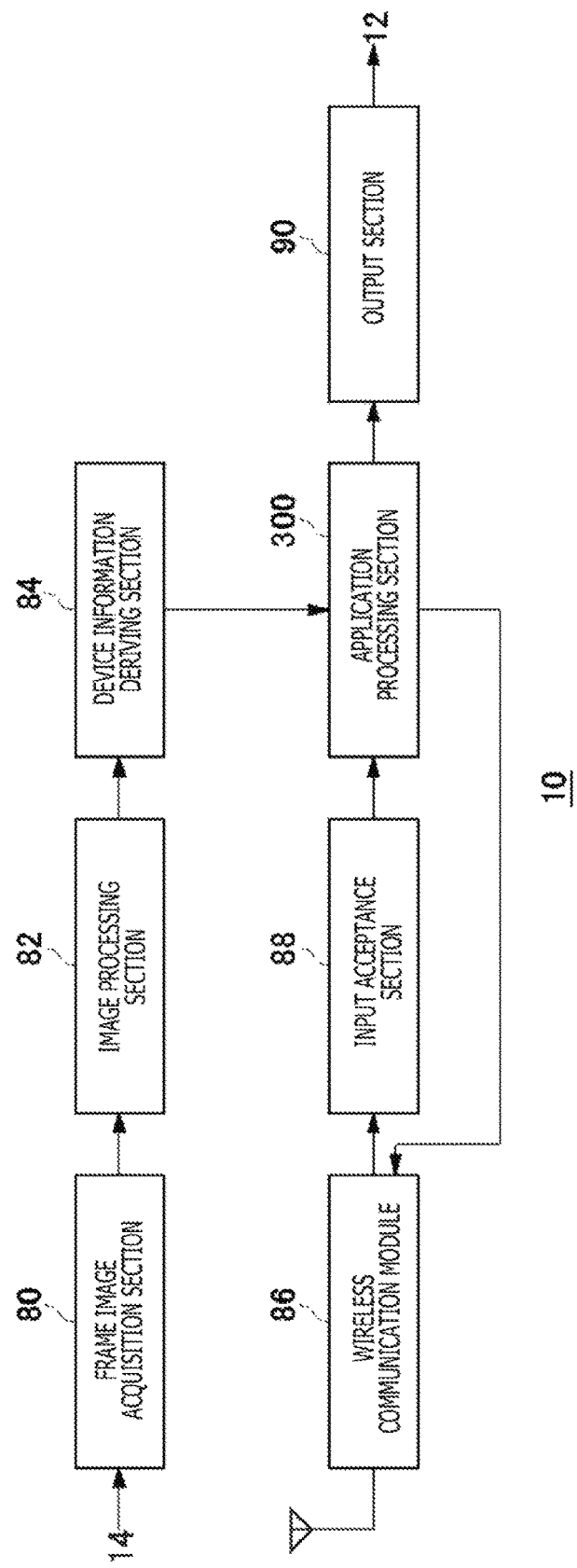
FIG. 6 is a diagram illustrating a configuration of a gaming apparatus.

FIG. 6 illustrates a configuration of the gaming apparatus 10. The gaming apparatus 10 includes a frame image acquisition section 80, an image processing section 82, a device information deriving section 84, a wireless communication module 86, an input acceptance section 88, an output section 90, and an application processing section 300. The processing capability of the gaming apparatus 10 in the present embodiment is realized by a central processing unit (CPU), a memory, and a program loaded into the memory, and so on. Here, a configuration is depicted that is realized by these components working with each other in a coordinated fashion. The program may be built into the gaming apparatus 10. Alternatively, the program may be externally supplied stored in a recording medium. Therefore, it is to be understood by those skilled in the art that these functional blocks can be realized in various ways by hardware alone, software alone, or a combination thereof. It should be noted that the gaming apparatus 10 may have a plurality of CPUs from a viewpoint of hardware configuration.

The wireless communication module 86 establishes wireless communication with the wireless communication module 48 of the input apparatus 20. This allows the input apparatus 20 to send operating button state information and detection value information of the triaxial acceleration sensor 56 and the triaxial gyrosensor 58 to the gaming apparatus 10 at a given interval.

The wireless communication module 86 receives operating button state information and sensor detection value information sent from the input apparatus 20 and supplies them to the input acceptance section 88. The input acceptance section 88 separates button state information and sensor detection value information and hands them over to the application processing section 300. The application processing section 300 receives button state information and sensor detection value information as a game operation instruction. The application processing section 300 treats sensor detection value information as attitude information of the input apparatus 20.

The frame image acquisition section 80 is configured as a USB interface and acquires frame images at a given imaging speed (e.g., 30 frames/second) from the imaging apparatus 14. The image processing section 82 extracts a light-emitting body image from a frame image. The image processing section 82 identifies the position and size of the light-emitting body in the frame images. For example, as the light-emitting body 22 of the input apparatus 20 emits light in a color that is unlikely used in the user's environment, the image processing section 82 can extract a light-emitting body image from a frame image with high accuracy. The image processing section 82 may generate a binarized image by binarizing frame image data using a given threshold. This binarization encodes a pixel value of a pixel having luminance higher than the given threshold as "1" and the pixel value of a pixel having luminance equal to or lower than the given threshold as "0." By causing the light-emitting body 22 to light up at luminance beyond this given threshold, the image processing section 82 can identify the position and size of the light-emitting body image from the binarized image. For example, the image processing section 82 identifies coordinates of a center of gravity and a radius of the light-emitting body image in the frame image.

The device information deriving section 84 derives position information of the input apparatus 20 and the head-mounted display 100 as seen from the imaging apparatus 14 from the position and size of the light-emitting body image identified by the image processing section 82. The device information deriving section 84 derives position coordinates in camera coordinates from the center of gravity of the light-emitting body image and also derives distance information from the imaging apparatus 14 from the radius of the light-emitting body image. The position coordinates and the distance information make up position information of the input apparatus 20 and the head-mounted display 100. The device information deriving section 84 derives position information of the input apparatus 20 and the head-mounted display 100 for each frame image and hands over position information to the application processing section 300. The application processing section 300 receives position information of the input apparatus 20 and the head-mounted display 100 as a game operation instruction.

The application processing section 300 progresses the game from position information and attitude information of the input apparatus 20 and button state information and generates an image signal indicating processing results of the game application. The image signal is sent to the display apparatus 12 from the output section 90 and output as a display image.

Figure 7:
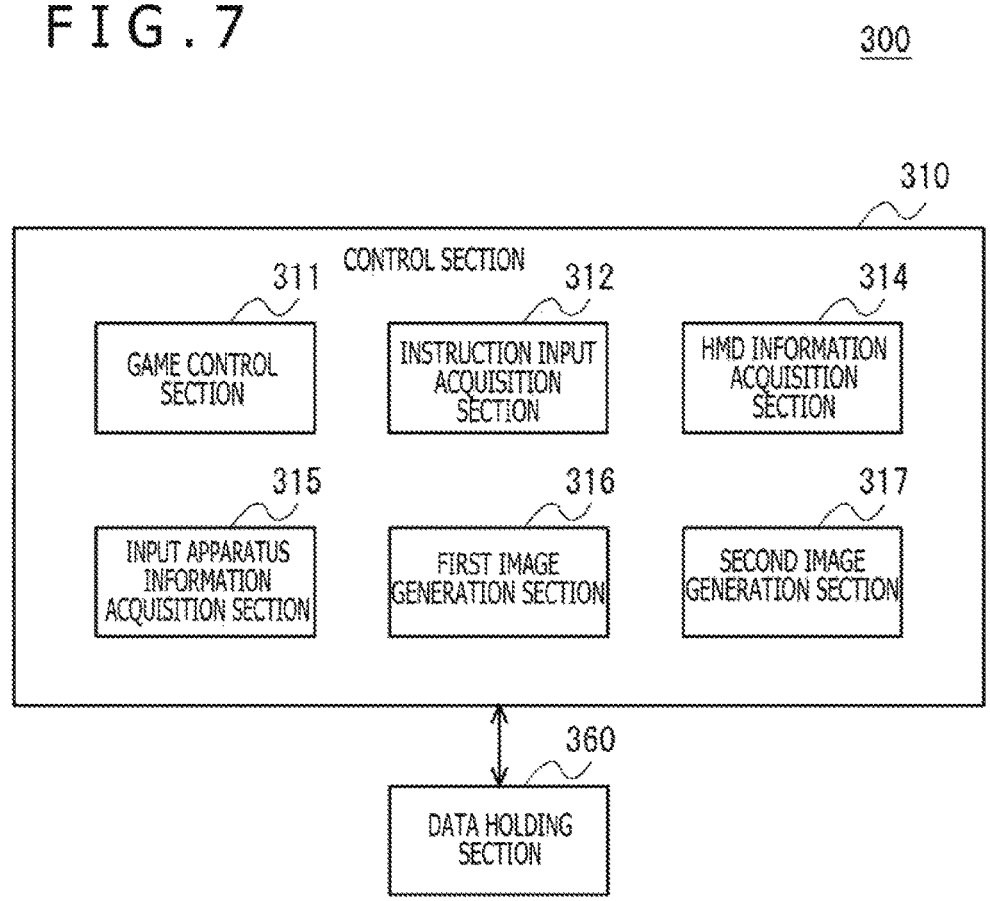
FIG. 7 is a functional configuration diagram of the gaming apparatus.

FIG. 7 is a functional configuration diagram of the gaming apparatus 10. The application processing section 300 of the gaming apparatus 10 includes a control section 310 and a data holding section 360. The control section 310 includes a game control section 311, an instruction input acquisition section 312, an HMD information acquisition section 314, an input apparatus information acquisition section 315, a first image generation section 316, and a second image generation section 317.

The data holding section 360 holds program data of games executed in the gaming apparatus 10, various data used by the game programs, and so on.

The instruction input acquisition section 312 acquires information related to user instruction input accepted by the input apparatus 20 or the head-mounted display 100 from the input apparatus 20 or the head-mounted display 100.

The HMD information acquisition section 314 acquires information related to the attitude of the head-mounted display from the head-mounted display 100. Also, the HMD information acquisition section 314 acquires information related to the position of the head-mounted display 100 from the device information deriving section 84. These pieces of information are conveyed to the game control section 311. Information related to the attitude of the head-mounted display 100 may be acquired by the device information deriving section 84 analyzing a captured image of the head-mounted display 100.

The input apparatus information acquisition section 315 acquires information related to the attitude of the input apparatus 20. Also, the input apparatus information acquisition section 315 acquires information related to the position of the input apparatus 20 from the device information deriving section 84. These pieces of information are conveyed to the game control section 311. Information related to the attitude of the input apparatus 20 may be acquired by the device information deriving section 84 analyzing a captured image of the input apparatus 20.

If the input apparatus 20 moves out of the imaging range of the imaging apparatus 14 or if the input apparatus 20 is hidden behind the user's body or an obstacle and fails to be imaged by the imaging apparatus 14, the input apparatus information acquisition section 315 calculates the position of the input apparatus 20 based on the previously acquired position of the input apparatus 20 and information related to the attitude of the input apparatus 20 acquired after that point in time. For example, the current position of the input apparatus 20 may be calculated by calculating a deviation from the previously acquired position of the input apparatus 20 based on translational acceleration data acquired from the acceleration sensor of the input apparatus 20. While the input apparatus 20 is not imaged by the imaging apparatus 14, the position of the input apparatus 20 is successively calculated in the similar manner. When the input apparatus 20 is imaged again by the imaging apparatus 14, there is a possibility that the position of the input apparatus 20 successively calculated from acceleration data may not indicate a correct position due to cumulative drift error. Therefore, the position of the input apparatus 20 newly calculated by the device information deriving section 84 may be used as the current position of the input apparatus 20. The same is true for the head-mounted display 100.

The game control section 311 executes the game program and progresses the game based on user instruction input acquired by the instruction input acquisition section 312 and information related to the position or attitude of the input apparatus 20 or the head-mounted display 100. The game control section 311 changes the position of a player's character, an operation target, based on input made by directional keys or an analog stick of the input apparatus 20 and a change in position of the input apparatus 20 or the head-mounted display 100 in a game field made up of a virtual three-dimensional (3D) space.

The first image generation section 316 generates an image to be displayed on the head-mounted display 100. The first image generation section 316 generates a game field image by specifying a viewpoint position based on the position of the operation target controlled by the game control section 311, specifying a direction of line of sight based on the attitude of the head-mounted display 100, and rendering a virtual 3D space. The first image generation section 316 associates the attitude of the head-mounted display 100 and the direction of line of sight in the game field at a given time and changes, thereafter, the direction of line of sight with change in the attitude of the head-mounted display 100. As a result, the user can look over the game field by actually moving his or her head, allowing the user to feel as if he or she were really in the game field. The first image generation section 316 generates a first image by adding information related to the game, an image to be displayed on the head-mounted display 100, and so on to the generated game field image. The first image generated by the first image generation section 316 is sent to the head-mounted display 100 via a wireless communication module or a wired communication module.

The second image generation section 317 generates an image to be displayed on the display apparatus 12. When the same image as displayed on the head-mounted display 100 is displayed on the display apparatus 12, the first image generated by the first image generation section 316 is also sent to the display apparatus 12. When an image different from the image displayed on the head-mounted display 100 is displayed on the display apparatus 12, an example of which is when the user wearing the head-mounted display 100 and the user watching the display apparatus 12 execute a head-to-head game, the second image generation section 317 generates a game field image by specifying a viewpoint position and a direction of line of sight different from those specified by the first image generation section 316. The second image generation section 317 generates a second image by adding information related to the game, an image to be displayed on the display apparatus 12, and so on to the generated game field image. The second image generated by the second image generation section 317 is sent to the display apparatus 12 via a wireless communication module or a wired communication module.

Figure 8:
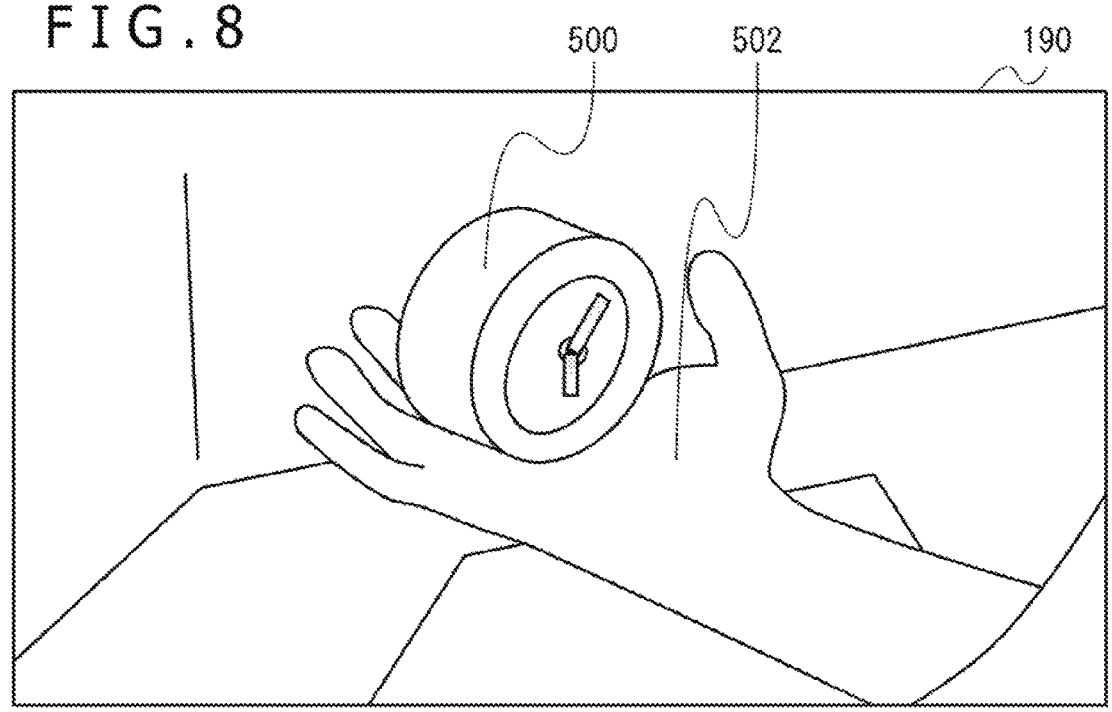
FIG. 8 is a diagram illustrating an example of an image displayed on the head-mounted display.

FIG. 8 illustrates an example of an image displayed on the head-mounted display. The game control section 311 provides a function to hold an object, arranged in the game field, a virtual 3D space, in his or her hand and observe the object. The game control section 311 that also functions as a position control section for controlling object positions arranges a virtual user's hand 502 at the position of the game field corresponding to the input apparatus 20 based on the relative position between the input apparatus 20 and the head-mounted display 100. When the user moves the input apparatus 20 such that the virtual user's hand 502 enters a given area near an object 500 arranged in the game field and presses a given button, the game control section 311 moves the object 500 onto the virtual user's hand 502.

The virtual user's hand 502 and the object 500 are moved by the game control section 311 with change in the relative position between the input apparatus 20 and the head-mounted display 100. In order to display, in magnified form, the object 500 for detailed observation, therefore, it is only necessary to bring the virtual user's hand 502 closer to virtual user's eyes by bringing the hand holding the input apparatus 20 closer to the head-mounted display 100 as is done in the real world. At this time, the image displayed on the head-mounted display 100 is a parallax image for binocular stereopsis. Therefore, if the object 500 is moved too close, the parallax becomes too large to achieve focus, making the image more difficult to see instead. In the present embodiment, therefore, when the input apparatus 20 is moved closer to the head-mounted display 100 such that the distance between the input apparatus 20 and the head-mounted display 100 becomes shorter than a given first distance, the object is displayed in magnified form by magnifying the object while maintaining the distance to the viewpoint position equal to or longer than a second distance rather than bringing the object closer to the viewpoint position in the virtual world. As a result, in the head-mounted display that realizes stereopsis using a parallax image, the object moved closer to the viewpoint position can be displayed in an easier-to-see manner, contributing to improved user convenience.

Figure 9:
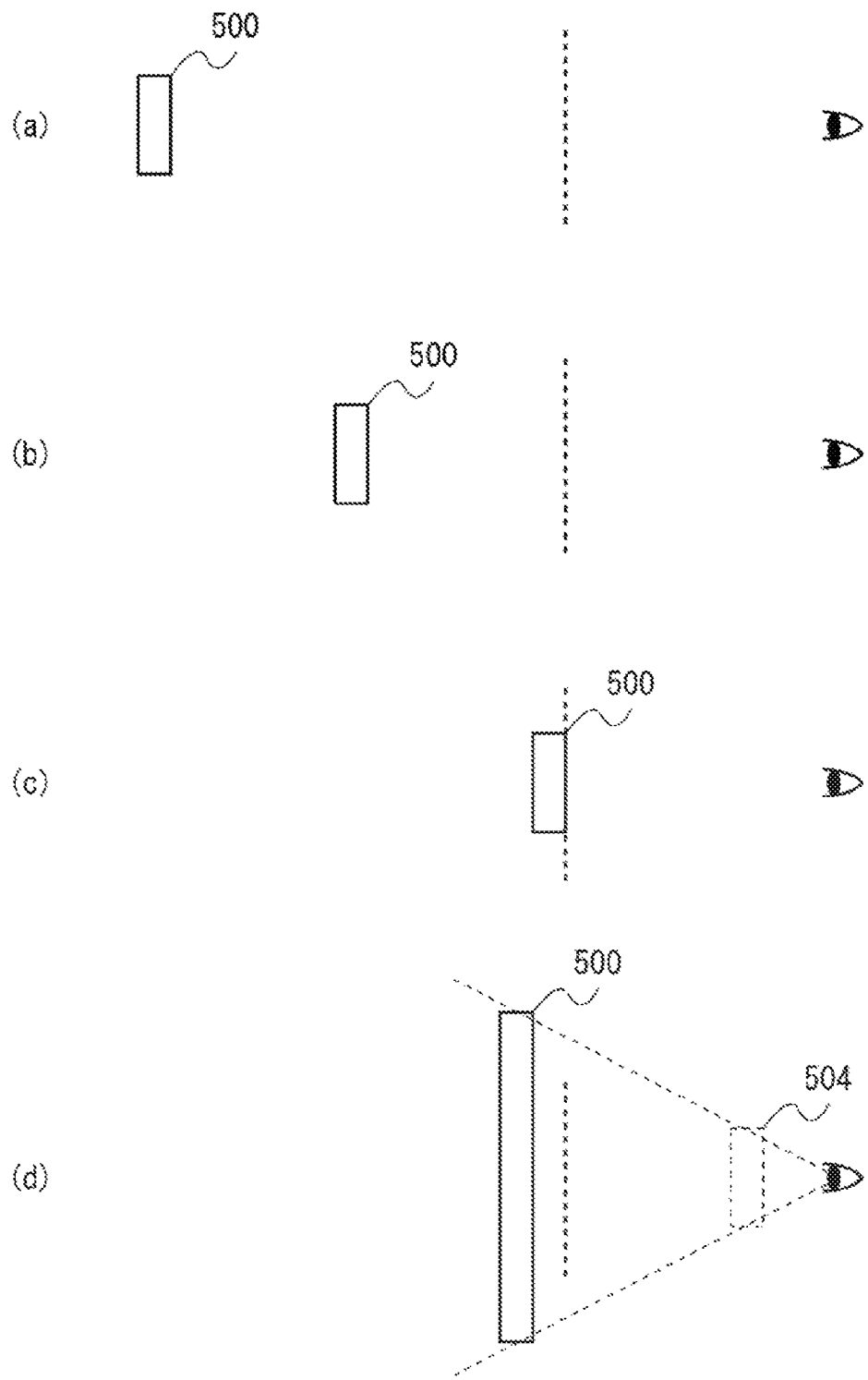
FIGS. 9(a) to 9(d) are schematic diagrams for describing a manner in which an object arranged in a virtual space is displayed.

FIG. 9 depicts schematic diagrams for describing a manner in which an object arranged in a virtual space is displayed. When the object 500 that was arranged at the position depicted in FIG. 9(a) is placed on the virtual user's hand 502 first, after which the input apparatus 20 is moved closer to the head-mounted display 100, and as the distance between the input apparatus 20 and the head-mounted display 100 becomes shorter, the object 500 is moved closer to the viewpoint position as depicted in FIG. 9(b). When the input apparatus 20 is moved further closer to the head-mounted display 100, and, as depicted in FIG. 9(c), when the distance between the object 500 and the viewpoint position reaches the second distance, the game control section 311 does not move the object 500 closer to the viewpoint position even if the input apparatus 20 is moved closer to the head-mounted display 100. That is, as depicted in FIG. 9(d), the object 500 is magnified at a position farther away than the second distance rather than moving the object 500 to the position of an object 504 in an 'as-is' manner.

Thus, according to the present embodiment, even when the input apparatus 20 is closer than the first distance, the object 500 can be displayed in an easier-to-see manner. However, because the object 500 is displayed in an easier-to-see manner, the user may move the input apparatus 20 too close to his or her eyes, resulting in the input apparatus 20 striking a housing of the head-mounted display 100. In the present embodiment, therefore, in order to prevent the user from moving the input apparatus 20 too close to the head-mounted display 100, when the distance between the input apparatus 20 and the head-mounted display 100 reaches a third distance that is longer than the distance between the edge of the housing of the head-mounted display 100 and the user's eyes, the visual recognizability of the object 500 is reduced to make it less easy to see. Specifically, when the distance between the input apparatus 20 and the head-mounted display 100 becomes shorter than the third distance, the object 500 is magnified significantly, thereby preventing the entire image of the object 500 from being displayed. As a result, it is possible to prevent the user from moving the input apparatus 20 any closer, thereby reducing situations where the input apparatus 20 strikes the head-mounted display 100.

Figure 10:
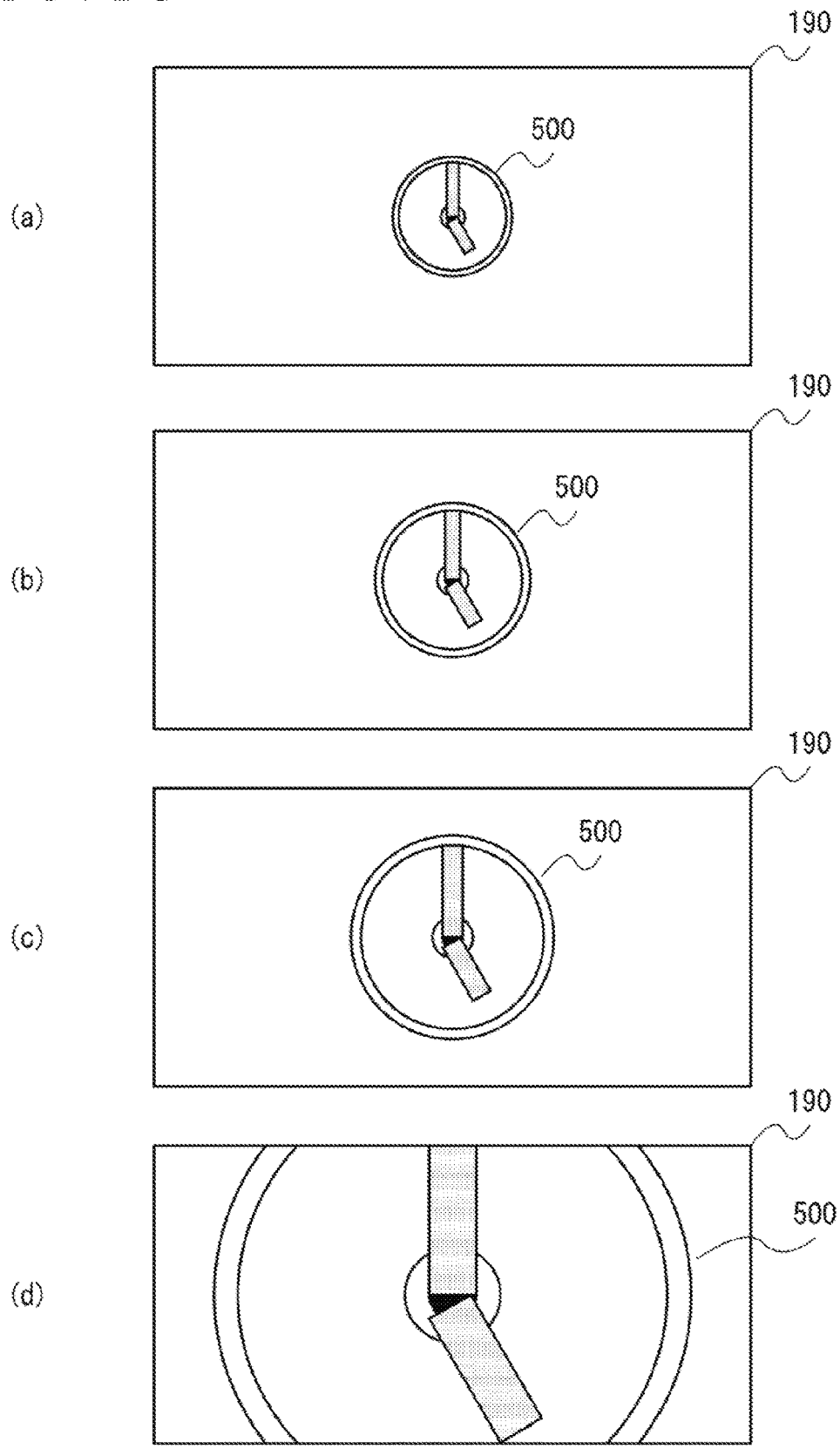
FIGS. 10(a) to 10(d) are diagrams for describing a manner in which an object arranged in a virtual space is displayed.

FIG. 10 depicts diagrams for describing a manner in which an object arranged in a virtual space is displayed. FIG. 10(a) illustrates a display screen when the object 500 is arranged at the position depicted in FIG. 9(a). When the input apparatus 20 is moved closer to the head-mounted display 100, and as the distance between the input apparatus 20 and the head-mounted display 100 becomes shorter, the object 500 is moved closer to the viewpoint position, causing the object 500 to be displayed larger as depicted in FIG. 10(b). When the distance between the input apparatus 20 and the head-mounted display 100 becomes shorter than the third distance as a result of the movement of the input apparatus 20 further closer to the head-mounted display 100, and if the object 500 was magnified linearly in an 'as-is' manner, the object 500 would be displayed as depicted in FIG. 10(c). Instead, however, the object 500 is magnified significantly and displayed as depicted in FIG. 10(*d*). As a result, it is impossible to visually recognize the entire object 500 because it is magnified excessively, thereby preventing the user from moving the input apparatus 20 any closer to his or her eyes.

Figure 11:
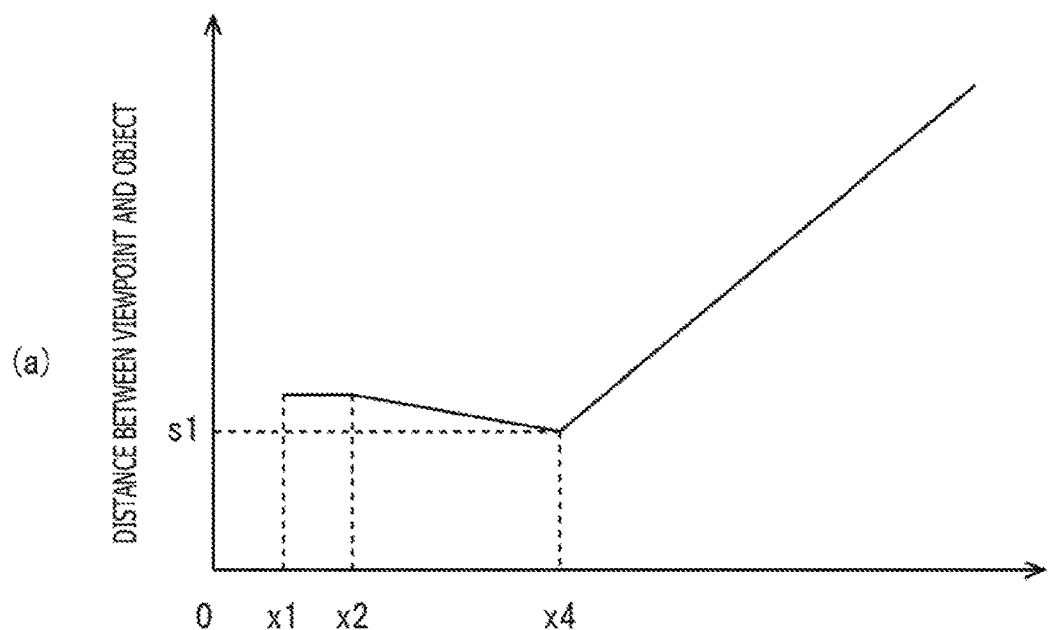
FIGS. 11(a) and 11(b) are diagrams illustrating a relationship between a distance between the input apparatus and the head-mounted display and the manner in which an object is displayed.
Figure 11:
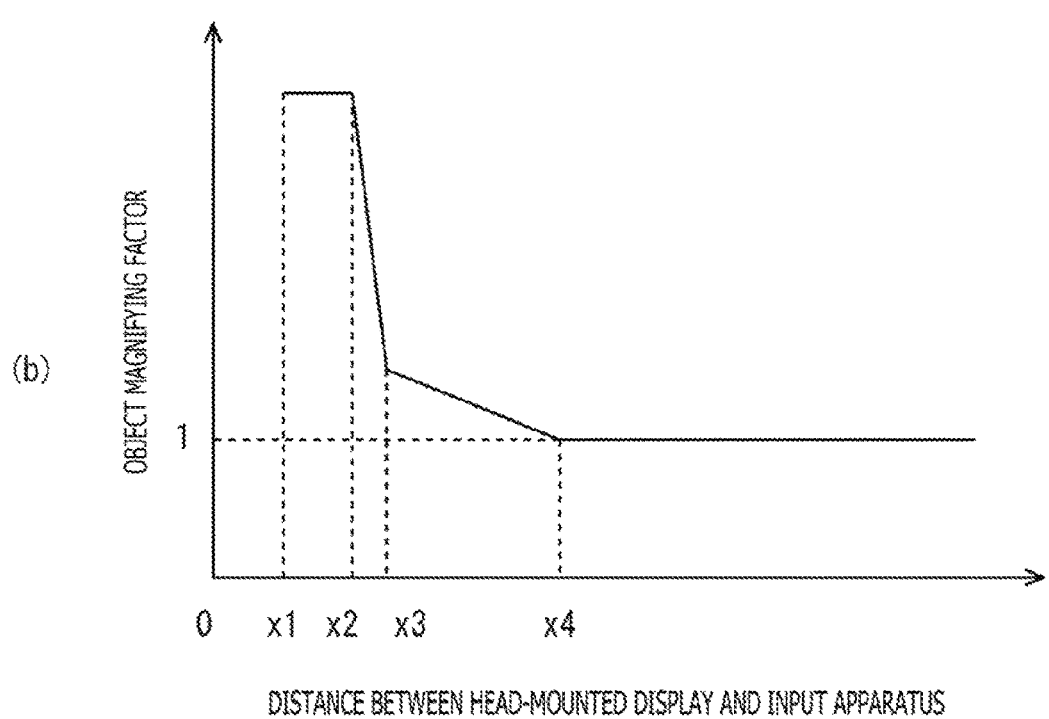

FIG. 11 illustrates a relationship between a distance between the input apparatus and the head-mounted display and the manner in which an object is displayed. FIG. 11(*a*) illustrates a relationship between the distance between the input apparatus 20 and the head-mounted display 100 in the real world and the distance between an object and a viewpoint position in the virtual world. FIG. 11(*b*) illustrates a relationship between the distance between the input apparatus 20 and the head-mounted display 100 in the real world and a magnifying factor of the object in the virtual world. When the distance between the input apparatus 20 and the head-mounted display 100 is longer than a first distance x4, that is, when the distance between the object and the viewpoint position is longer than a second distance s1, the game control section 311 linearly changes the distance between the object and the viewpoint position in accordance with the change in the distance between the input apparatus 20 and the head-mounted display 100. At this time, the magnifying factor of the object is 1, and the object is neither magnified nor reduced.

When the distance between the input apparatus 20 and the head-mounted display 100 is shorter than x4, the game control section 311 determines the object position in accordance with a criterion different from that used when the distance is longer than x4. Specifically, the distance between the object and the viewpoint position is not reduced shorter than the second distance s1, and the object is magnified and arranged at a position farther away than the second distance s1 from the viewpoint position. As the distance between the input apparatus 20 and the head-mounted display 100 becomes shorter, the magnifying factor of the object is increased to display the object larger. The magnifying factor of the object may be changed linearly with change in the distance between the input apparatus 20 and the head-mounted display 100 or may be changed non-linearly. The distance between the object and the viewpoint position may be fixed at s1. Alternatively, the distance may be longer than s 1 as depicted in FIG. 11(*a*). As the distance between the input apparatus 20 and the head-mounted display 100 becomes shorter, the object may be moved farther away from the viewpoint position. The distance between the object and the viewpoint position may be changed linearly in accordance with the change in the distance between the input apparatus 20 and the head-mounted display 100 or may be changed non-linearly.

When the distance between the input apparatus 20 and the head-mounted display 100 becomes shorter than a third distance x3, the game control section 311 increases the object display size larger than the display size determined in accordance with the criterion used when the distance is longer than the third distance x3. In the example depicted in this figure, when the distance between the input apparatus 20 and the head-mounted display 100 becomes shorter than the third distance x3, the object is magnified significantly. Also in this case, the magnifying factor of the object may be changed linearly with change in the distance between the input apparatus 20 and the head-mounted display 100 or may be changed non-linearly. Also, the magnifying factor of the object may be changed discontinuously.

In the range between a distance x1 and a distance x2 where the input apparatus 20 strikes the housing of the head-mounted display 100, the distance between the viewpoint position and the object and the object magnifying factor are constant regardless of the distance between the input apparatus 20 and the head-mounted display 100. That is, even if the input apparatus 20 is moved closer to the head-mounted display 100 than the distance x2, the object is displayed in the same manner. By doing so, it is also possible to prevent the user from moving the input apparatus 20 any closer to his or her eyes.

In the example described above, difficulty in achieving focus because of the object coming excessively close to the viewpoint position is avoided by keeping the viewpoint position and the object separated more than the second distance. In another example, when the distance between the viewpoint position and the object is shorter than the second distance, the amount of parallax at the time of generating a parallax image for binocular stereopsis may be made smaller than the amount corresponding to the distance between the viewpoint position and the object. As a result, although the sense of perspective with respect to the object is different from what it is supposed to be, the visual recognizability of the object can be increased. In this case, when the distance between the input apparatus 20 and the head-mounted display 100 becomes shorter than the third distance, the visual recognizability of the object may be reduced by increasing the amount of parallax with respect to the object.

Figure 12:
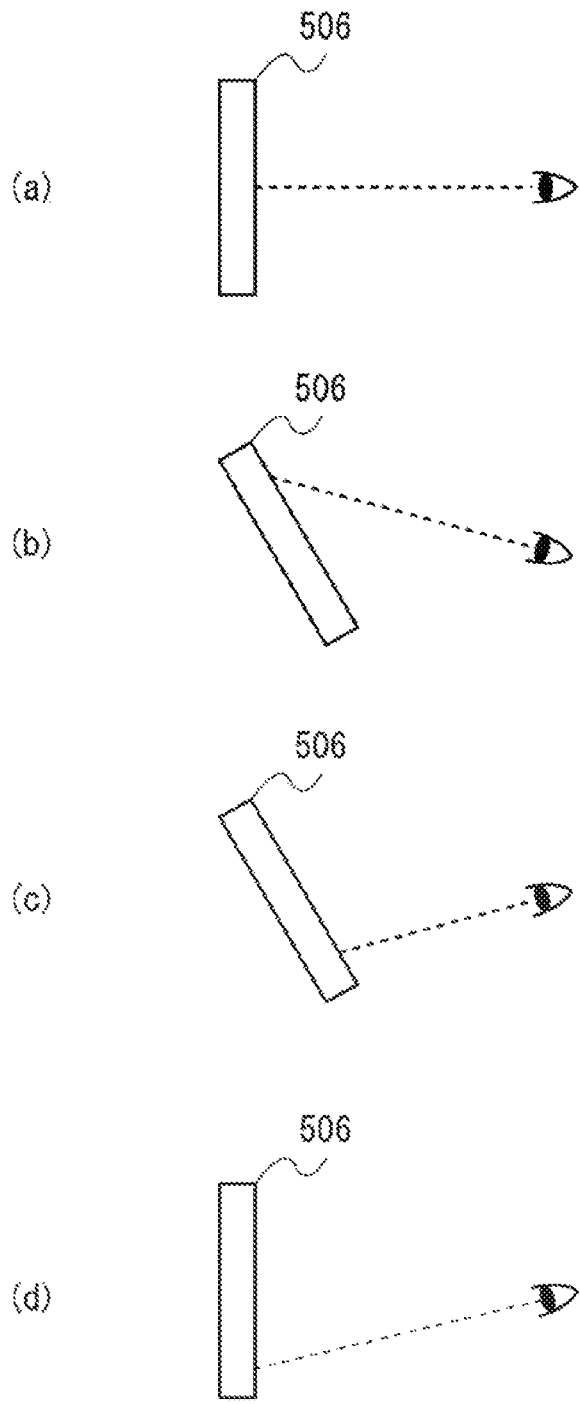
FIGS. 12(a) to 12(d) are schematic diagrams for describing a manner in which an object arranged in a virtual space is displayed.

FIG. 12 depicts schematic diagrams for describing a manner in which an object arranged in a virtual space is displayed. When the object is relatively small in size, or, as depicted in FIG. 12(*a*), when an object 506 is arranged such that the front surface thereof is vertical to the direction of line of sight, for example, the manner in which the object 506 is displayed is determined as depicted in FIG. 11 based on the distance between the position of the center of gravity of the object or the viewpoint position of the center of gravity of the front surface of the object and the viewpoint position. However, as depicted in FIGS. 12(*b*) and 12(*c*), when the relatively large object 506 is arranged in a slanting position relative to the direction of line of sight, or, as depicted in FIG. 12(*d*), when the user is gazing at an area different from the position of the center of gravity of the front surface of the object, the distance to the viewpoint position varies significantly depending on the position at which the user is gazing. For example, when the user is gazing at the front side portion of the object 506 as depicted in FIG. 12(*c*), it may be difficult to achieve focus because the object 506 is too close. In the present embodiment, therefore, the manner in which the object 506 is displayed is determined based on the distance between the area at which the user is gazing, i.e., a point of intersection between the direction of the user's line of sight and the front surface of the object 506 and the viewpoint position. Specifically, when the distance between the area at which the user is gazing and the viewpoint position is shorter than the second distance, the area at which the user is gazing is difficult to put into focus because it is too close. Therefore, the position where the object 506 is arranged is moved farther away in accordance with the method depicted in FIG. 11, and then the object 506 is magnified. As a result, the visual recognizability of the area at which the user is gazing can be improved. It should be noted that the direction of the user's line of sight may be calculated from the attitude of the head-mounted display 100, calculated from the direction of user's eyeballs by providing a camera for shooting the user's eyeballs inside the head-mounted display 100, or calculated by using a known and arbitrary line-of-sight tracking technology.

Figure 13:
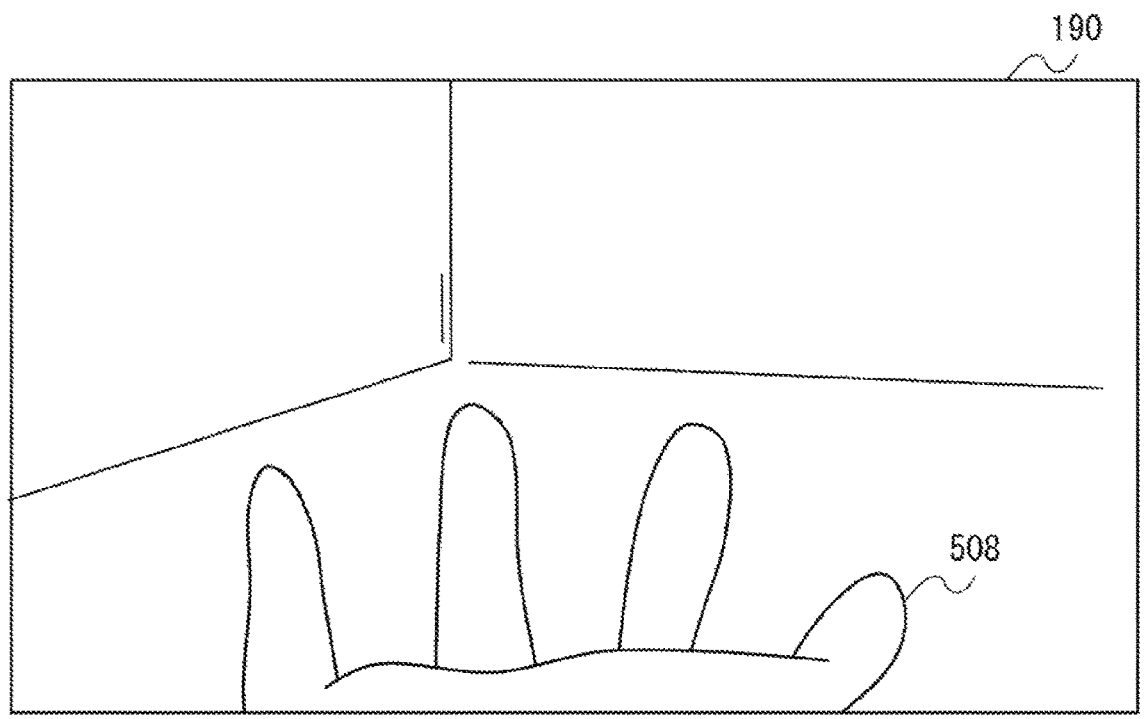
FIG. 13 is a diagram illustrating an example of an image displayed on the head-mounted display.

FIG. 13 illustrates an example of an image displayed on the head-mounted display. This figure depicts the display screen of a function for moving the viewpoint position with the movement of the input apparatus 20. In the example described above, the viewpoint position was moved as the head-mounted display 100 moved. However, when the user executes a game seated, it is difficult to move the head-mounted display 100 significantly. Also, if the viewpoint position can be moved with slight movement of the head-mounted display 100 to ensure that the viewpoint position can be moved significantly with movement of the head-mounted display 100, the user will likely become motion sick due to viewpoint shake. In the present embodiment, therefore, the present embodiment provides a function to move the viewpoint position by moving the input apparatus 20 that is easier to move than the head-mounted display 100. As a result, it is possible to move the viewpoint position with hands that have the greatest range of motion of all parts of the body, thereby ensuring improved user convenience.

Part of a virtual user's hand 508 is depicted on the display screen. Unlike the example in FIG. 8, the entire virtual user's hand 508 is not depicted, and only part of the fingers is depicted. This makes it possible to make the user feel as if he or she were moving on the virtual user's hand 508. When the input apparatus 20 is moved, the viewpoint position may be moved by an amount of travel comparable to the amount of travel of the input apparatus 20 in the real world or may be moved by a greater amount of travel. The viewpoint position may be moved by different amounts of travel between when the input apparatus 20 is moved in the directions parallel to the display screen, i.e., horizontally or vertically, and in the direction perpendicular to the display screen, i.e., the depth direction. For example, when moved horizontally, the viewpoint position is moved by an amount of travel comparable to the amount of travel of the input apparatus 20 in the real world. However, when moved perpendicularly, the viewpoint position may be moved by a greater amount of travel. It should be noted that it has been experimentally revealed by the present inventor et al. that motion sickness is less likely to occur when part of the user's hand is displayed than when it is not displayed. Also, motion sickness is less likely to occur when part of the user's hand is displayed larger than when it is displayed smaller.

The embodiment of the present invention has been described above. The present embodiment is illustrative, and it is to be understood by those skilled in the art that the combination of components and processes thereof can be modified in various ways and that these modification examples also fall within the scope of the present invention.

Although an image for binocular stereopsis was displayed on the display apparatus 190 of the head-mounted display 100 in the above example, an image for monocular stereopsis may be displayed in a different example.

Although the head-mounted display 100 was used in a game system in the above example, the technology described in the embodiment can be used to display content other than games.

REFERENCE SIGNS LIST

10 Gaming apparatus, 20 Input apparatus, 100 Head-mounted display, 190 Display apparatus, 311 Game control section, 312 Instruction input acquisition section, 314 HMD information acquisition section, 315 Input apparatus information acquisition section, 316 First image generation section, 317 Second image generation section.

INDUSTRIAL APPLICABILITY

The present invention is applicable to a display control apparatus for controlling display to a head-mounted display.

The invention claimed is:

1. A display control apparatus comprising:
a position control section adapted to control a position of an object arranged in a virtual three-dimensional space based on a relative position between an input apparatus used by a user wearing a head-mounted display and the head-mounted display; and
a display control section adapted to generate an image in the virtual three-dimensional space including the object and display the image on the head-mounted display, wherein
when a distance between the input apparatus and the head-mounted display is equal to a first distance or more, the position control section linearly changes the object position in response to a change in position of the input apparatus, and
when the distance between the input apparatus and the head-mounted display is less than the first distance, the position control section determines the object position in accordance with a criterion different from that used when the distance between the input apparatus and the head-mounted display is equal to the first distance or more.

2. The display control apparatus of claim 1, wherein when the input apparatus is moved closer to the head-mounted display such that the distance between the input apparatus and the head-mounted display becomes shorter than the first distance, the position control section does not move the object closer than a second distance in the virtual three-dimensional space, arranges the object at a position farther away from a viewpoint position than the second distance, and displays the object in magnified form by magnifying the object.

3. The display control apparatus of claim 1, wherein when a distance between the position of a point of intersection between a direction of line of sight and the object and the viewpoint position becomes shorter than the second distance, the position control section arranges the object at a position where the distance between the position of the point of intersection and the viewpoint position is longer than the second distance and displays the object in magnified form by magnifying the object.

4. The display control apparatus of claim 1, wherein when the distance between the input apparatus and the head-mounted display is shorter than a third distance that is shorter than the first distance, the display control section displays the object in larger size than a display size determined in accordance with a criterion used when the distance between the input apparatus and the head-mounted display is longer than a third distance.

5. The display control apparatus of claim 1, wherein the display control section changes the viewpoint position in response to movement of the head-mounted display or the input apparatus.

6. A display control method comprising:
by a position control section, controlling a position of an object arranged in a virtual three-dimensional space based on a relative position between an input apparatus used by a user wearing a head-mounted display and the head-mounted display; and
by a display control section, generating an image in the virtual three-dimensional space including the object and displaying the image on the head-mounted display, wherein
when a distance between the input apparatus and the head-mounted display is equal to a first distance or more, the position control section linearly changes the object position in response to a change in position of the input apparatus, and when the distance between the input apparatus and the head-mounted display is less than the first distance, the position control section determines the object position in accordance with a criterion different from that used when the distance between the input apparatus and the head-mounted display is equal to the first distance or more.

7. A non-transitory, computer-readable recording medium recording a display control program, the display control program, when executed by a computer, causing the computer to function as:

a position control section adapted to control a position of an object arranged in a virtual three-dimensional space based on a relative position between an input apparatus used by a user wearing a head-mounted display and the head-mounted display; and a display control section adapted to generate an image in the virtual three-dimensional space including the object and display the image on the head-mounted display, wherein when a distance between the input apparatus and the head-mounted display is equal to a first distance or more, the position control section linearly changes the object position in response to a change in position of the input apparatus, and when the distance between the input apparatus and the head-mounted display is less than the first distance, the position control section determines the object position in accordance with a criterion different from that used when the distance between the input apparatus and the head-mounted display is equal to the first distance or more.

* * * * *